United States Patent
Bruce

(10) Patent No.: US 10,336,312 B2
(45) Date of Patent: Jul. 2, 2019

(54) VEHICLE PROPULSION SYSTEM COMPRISING AN ELECTRICAL POWER COLLECTOR

(71) Applicant: VOLVO TRUCK CORPORATION, Göteborg (SE)

(72) Inventor: Maria Bruce, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 378 days.

(21) Appl. No.: 14/787,244

(22) PCT Filed: May 8, 2013

(86) PCT No.: PCT/EP2013/001366
§ 371 (c)(1),
(2) Date: Oct. 26, 2015

(87) PCT Pub. No.: WO2014/180489
PCT Pub. Date: Nov. 13, 2014

(65) Prior Publication Data
US 2016/0114790 A1   Apr. 28, 2016

(51) Int. Cl.
*B60W 20/16* (2016.01)
*B60L 1/02* (2006.01)
(Continued)

(52) U.S. Cl.
CPC .............. *B60W 20/16* (2016.01); *B60L 1/02* (2013.01); *B60L 15/2045* (2013.01);
(Continued)

(58) Field of Classification Search
None
See application file for complete search history.

(56) References Cited

U.S. PATENT DOCUMENTS

| 5,582,262 A | 12/1996 | Wuest |
| 2004/0045753 A1* | 3/2004 | Yamaguchi ............ B60K 6/445 180/65.28 |

(Continued)

FOREIGN PATENT DOCUMENTS

| CN | 101529068 A | 9/2009 |
| CN | 101981412 A | 2/2011 |

(Continued)

OTHER PUBLICATIONS

Chinese Official Acton (dated Mar. 2, 2017) for corresponding Chinese App. 201380076397.6.
(Continued)

Primary Examiner — John Olszewski
Assistant Examiner — Gerrad A Foster
(74) Attorney, Agent, or Firm — WRB-IP LLP

(57) ABSTRACT

A vehicle propulsion system includes a combustion engine, an exhaust aftertreatment system connected to the combustion engine, and an electrical power collector for intermittently collecting electrical power from external power supply track during driving of the vehicle. The vehicle propulsion system includes a heating system that is arranged to heat at least one component of the exhaust aftertreatment system and/or the combustion engine. The electrical power collector is arranged for supplying the heating system with electrical power when collecting electrical power from the external power supply track.

20 Claims, 7 Drawing Sheets

(51) Int. Cl.
*B60L 15/20* (2006.01)
*B60M 1/12* (2006.01)
*F01N 3/20* (2006.01)
*F02D 29/02* (2006.01)
*B60L 50/53* (2019.01)
*B60L 50/61* (2019.01)
*B60L 50/62* (2019.01)
*B60L 53/12* (2019.01)

(52) U.S. Cl.
CPC ............... *B60L 50/53* (2019.02); *B60L 50/61* (2019.02); *B60L 50/62* (2019.02); *B60L 53/12* (2019.02); *B60M 1/12* (2013.01); *F01N 3/2066* (2013.01); *F02D 29/02* (2013.01); *B60W 2550/402* (2013.01); *B60W 2710/06* (2013.01); *Y02T 10/6217* (2013.01); *Y02T 10/645* (2013.01); *Y02T 10/7005* (2013.01); *Y02T 10/7072* (2013.01); *Y02T 10/7077* (2013.01); *Y02T 10/72* (2013.01); *Y02T 10/7283* (2013.01); *Y02T 90/122* (2013.01); *Y02T 90/14* (2013.01); *Y10S 903/905* (2013.01)

(56) References Cited

U.S. PATENT DOCUMENTS

2007/0169971 A1* 7/2007 Yamaguchi ............ B60K 6/445
                                                              180/65.28
2011/0184601 A1   7/2011 Shapery
2014/0288743 A1* 9/2014 Hokoi ................... B60W 20/40
                                                              701/22

FOREIGN PATENT DOCUMENTS

| CN | 102883933 A | | 1/2013 | |
|---|---|---|---|---|
| DE | 102011017721 A1 | | 10/2012 | |
| EP | 0603907 A2 | | 6/1994 | |
| JP | 2008274824 A | * | 6/2010 | |
| JP | 2010138868 A | * | 6/2010 | |
| JP | 2011196231 A | * | 10/2011 | |
| JP | 2013056614 A | * | 3/2013 | |
| JP | 2014217190 A | * | 11/2014 | ............... B61C 7/04 |
| WO | 2012111103 A1 | | 8/2012 | |
| WO | 2013038492 A1 | | 3/2013 | |

OTHER PUBLICATIONS

International Search Report (dated Mar. 5, 2014) for corresponding International App. PCT/EP2013/001366.
International Preliminary Report on Patentability (dated Sep. 25, 2015) for corresponding International App. PCT/EP2013/001366.

* cited by examiner

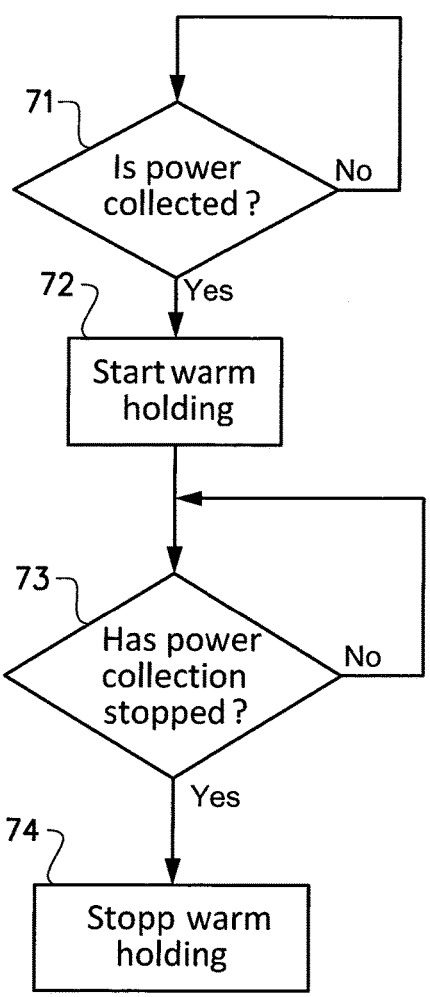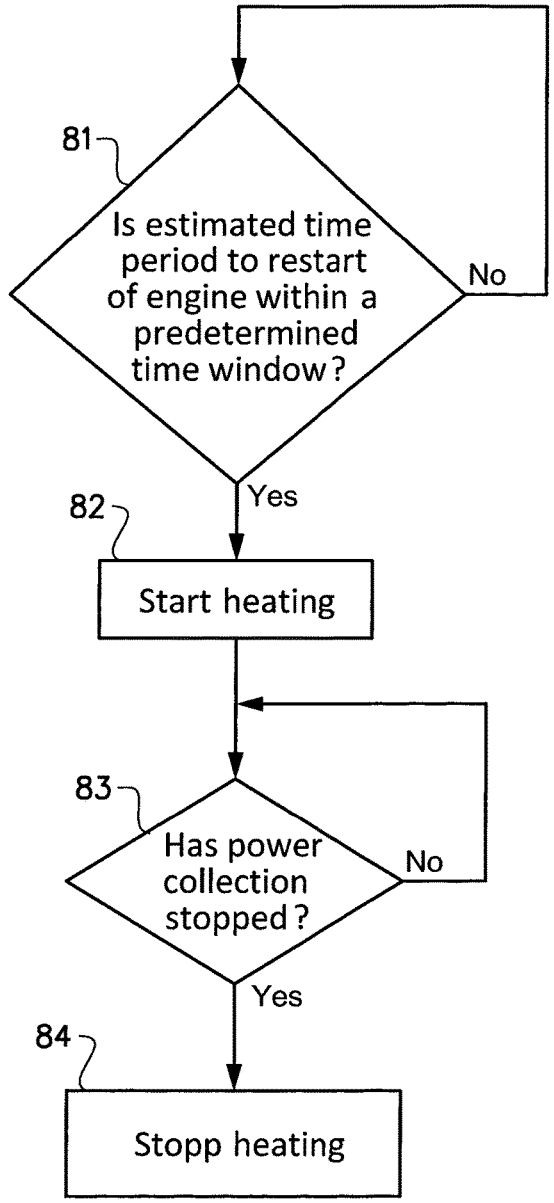
FIG. 7
FIG. 8

VEHICLE PROPULSION SYSTEM COMPRISING AN ELECTRICAL POWER COLLECTOR

BACKGROUND AND SUMMARY

This disclosure relates to a non-railbound vehicle propulsion system comprising a combustion engine, an exhaust aftertreatment system connected to the combustion engine, and an electrical power collector for intermittently collecting electrical power from an external power supply track during driving of the vehicle. The disclosure also relates to a method for heating at least one component of a vehicle exhaust aftertreatment system and/or a combustion engine of a vehicle propulsion system by means of an electrical heating system. The vehicle propulsion system and corresponding method may be implemented in many types of road and off-road vehicles, such as trucks, busses, cars, construction vehicles, and the like.

It is known to provide hybrid-electric vehicles with an electrical power collector that is arranged to be connectable to an external power supply track during driving of the vehicle for withdrawing electrical power from said external power supply track. Such a device is for example known from U.S. Pat. No. 5,582,262. This type of vehicle propulsion systems have the advantage of being able to access relatively low cost electrical energy from an external source when driving along a travel path having power supply track, but without being bound to the limited availability of the power supply tracks. The need of a complex and costly battery pack is also reduced due to the sliding connectability to the power supply track during driving of the vehicle.

Prior art vehicle propulsion system with electrical power collectors is however yet fully developed and further improvements in performance are possible.

It is desirable to provide a non-railbound vehicle propulsion system comprising an electrical power collector for collecting electrical power from a power supply track having improved performance.

The disclosure concerns a vehicle propulsion system comprising a combustion engine, an exhaust aftertreatment system connected to the combustion engine, and an electrical power collector for intermittently collecting electrical power from an external power supply track during driving of the vehicle.

The disclosure is characterized in that the vehicle propulsion system comprises a heating system that is arranged to heat at least one component of the exhaust aftertreatment system and/or the combustion engine and that the electrical power collector is arranged for supplying the heating system with electrical power when collecting electrical power from the external power supply track.

When the vehicle propulsion system is powered by electrical energy from the power supply track the operation of the combustion engine of the vehicle propulsion system may be stopped for improved fuel efficiency. However, as to result of the stopped operation of the combustion engine, the combustion engine and the exhaust aftertreatment system cools down. When the vehicle propulsion system upon reaching the end of the power supply track subsequently must switch over to combustion engine propulsion again the combustion engine and/or exhaust aftertreatment system may exhibit a temperature below its normal working temperature, such that the performance is reduced. Similarly, the maximal power output of the electrical traction machine of the vehicle propulsion system may be selected to suffice as sole propulsion source only up to certain road inclinations but require additional propulsion power from the combustion engine during climbing of larger road inclinations, for the purpose of attaining a more cost-effective overall propulsion system. Also this kind of system will thus potentially suffer from a low temperature of components of the exhaust aftertreatment system and/or combustion engine at engine start-up.

A sudden switch from a stopped cold engine to a running engine with significant load may have detrimental effect to the engine in terms of service requirements. A cold engine having cold lubrication oil does not exhibit as good lubrication performance as a warm lubrication oil, thereby shortening the lift time of bearings, pistons, cylinders, and the like. Other parts of the engine that may be damaged if operating an engine at high load and with cold lubrication oil are the oil pump and the oil filter, which may not be dimensioned to withstand the elevated pressure caused by the high viscosity of cold lubrication oil.

Modern catalytic-based exhaust aftertreatment systems are often highly dependent on having a certain operating temperature to attain a sufficient catalytic process. For example, the use of selective catalytic reduction (SCR) for reducing NOx emissions is widespread within the automotive industry, with the most common technology using urea ($NH_2CONH_2$) as a precursor to ammonia ($NH_3$) for the catalytic removal of NOx emissions by converting a mixture of NOx and ammonia ($NH_3$) into nitrogen gas ($N_2$) and water ($H_2O$). However, the NOx abatement efficiency of an SCR catalyst has two-fold temperature dependence, limiting the efficiency during low-temperature exhaust conditions. The reaction rates of the catalytic reactions for NOx removal are dependent on temperature, with an active temperature window generally starting at a catalyst temperature of e.g. 150° C., depending also on the NO:NO2 ratio of the feedgas NOx emissions. Moreover, in case urea is employed as reductant for SCR, the decomposition reactions, i.e. thermolysis and hydrolysis of urea to produce gaseous ammonia and carbon dioxide, are highly dependent on temperature. If the exhaust temperature upstream the SCR catalyst is below a certain level, e.g. 200° C., there is a risk for incomplete urea decomposition, thus limiting the NOx removal efficiency. There is also a risk for formation of unwanted solid by-products through polymerization reactions, causing, clogging of the SCR catalyst and an increased back pressure of the exhaust aftertreatment system. Clearly, a sudden switch from a stopped engine and a cold exhaust aftertreatment system to a running engine will temporarily result in high NOx emission levels, until the operating temperature of the exhaust aftertreatment system has reached a sufficiently high temperature, such as about 150-200° C.

The problem of cold engine and/or cold exhaust aftertreatment system may be efficiently solved in that the vehicle propulsion system comprises a heating system that is arranged to heat at least one component of the exhaust aftertreatment system and/or the combustion engine. The electrical power collector of the vehicle propulsion system is arranged for supplying the heating system with electrical power when collecting electrical power from the external power supply track for cost-effective heating.

Without the heating system powered by electrical energy from the external power supply track, the exhaust emission reduction performance would be low during as certain initial time period because the operating temperature of the exhaust aftertreatment system would be below the threshold value. Alternatively, the combustion engine would have to be operated in a combustion mode a certain time period before reaching the end of the external power supply track for the purpose of heating the engine and exhaust aftertreatment system, thereby resulting in reduced fuel economy performance. Hence, the provision of an electrical heating system powered by electrical energy from the external power supply track results in improved performance of the vehicle propulsion system.

The disclosure also concerns a method for heating at least one component of a vehicle exhaust aftertreatment system and/or a combustion engine of a vehicle propulsion system by means of a heating system, wherein the vehicle propulsion system comprises an electrical power collector for intermittently collecting electrical power from an external power supply track during driving of the vehicle. The method comprises the step of supplying the heating system with electrical power from the electrical power collector when collecting electrical power from the external power supply track, thereby enabling improved performance.

Further advantages can be achieved through aspects of the present invention.

The vehicle propulsion system may comprise an electrical traction machine for propulsion of a hybrid electric vehicle and operation of the combustion engine may be configured for being stopped during at least part of the time when collecting electrical power from the external power supply track during driving, of the vehicle. By using mainly the electrical traction machine as propulsion means during collecting electrical energy from the power supply track and keeping the combustion engine in a stopped, stillstanding mode, significant fuel saving and emission reduction may be accomplished.

The vehicle propulsion system may comprise vehicle relative position determining means that is arranged to determine vehicle position in relation to power supply track availability. The vehicle relative position determining means may primarily be arranged to compare present geographic vehicle propulsion system position with stored data concerning geographical power supply track installation, and based thereon determine present and future vehicle position in relation to power supply track availability for the presently selected travel path. Possibly, the vehicle relative position determining means may also or alternatively include some type of dedicated short-range communication means located on the vehicle propulsion system and at least partly along the power supply track for locally, without knowledge of present geographic position, in real-time determine if the external power supply track is available at present vehicle position.

The electrical power collector may be arranged to collect electrical power while being in sliding contact with an electrical conductor of the power supply track, or by inductive, contact-less coupling between the electrical power collector and the power supply track. Sliding contact may be realised having power supply track positioned embedded in the ground, or above but adjacent to the ground, or at an elevated position above the road or travel path for driving. Inductive coupling may be realised by providing electrical conductors in or on the ground, or on any side of the vehicle. Sliding contact generally exhibits a higher power transfer efficiency factor than inductive coupling, but also higher demands on the power collector performance, higher wear and higher maintenance requirements.

The heating system may be arranged to heat the at least one component of the exhaust aftertreatment system and/or the combustion engine by means of at least one electrical heater, which comprises at least one electric resistive member that is arranged to convert electrical energy to heat. An electrical heater using an electric resistive member is a cost-effective and reliable solution for heating. An electric resistive member is generally also relatively small enabling compact installations.

The electric resistive, member may be fastened to, and arranged to conduct heat directly to the at least one component of the exhaust aftertreatment system and/or the combustion engine. This design solution enables a compact installation with few modifications of the present exhaust aftertreatment system layout. Service and repair of the exhaust aftertreatment system is also not negatively influenced to a significant degree. The electric resistive member may comprise a metal wire or strip, or a ceramic material. The wire, strip or ceramic material may be attached to an exterior surface of the component to heat, or be embedded within the component. The ceramic material may as such form a component of the component to heat, or may be laminated to a material part of the component.

The at least one electric resistive member may be arranged to heat a fluid heat transport medium, such as air, and the fluid heat transport medium may be arranged to heat the at least one component of the exhaust aftertreatment system and/or the combustion engine. The electric resistive member may consequently be spaced apart from the component, and a heat carrier, for example air, carries the heat from the electrical heater to the engine and/or component of the exhaust aftertreatment system. This may be solved practically in many ways. For example, the at least one component of the exhaust aftertreatment system and/or the combustion engine may be substantially enclosed by a common or individual housing that defines at least one cavity between the housing and the at least one component of the exhaust aftertreatment system and/or the combustion engine, which at least one cavity may be filled the fluid heat transport medium. Typically, heated air within the cavity or supplied to the cavity may thus heat the components of the exhaust aftertreatment system and/or the combustion engine. Alternatively, the exhaust aftertreatment system may comprise at least one flow junction for allowing the heated fluid transport medium to enter inside the at least one component of the exhaust aftertreatment system. Still more alternatively, a flow of heated fluid transport medium may simply be directed towards an exterior surface of the at least one component of the exhaust aftertreatment system and/or the combustion engine.

A control unit may be arranged to control operation of the heating system based on the determined vehicle relative position. This enables many alternative intelligent heating strategies of the at least one component of the exhaust aftertreatment system and/or the combustion engine, thereby enabling improved energy efficiency, performance and reduced emissions. For example, the control unit may be arranged to coordinate operation of the heating system with an estimated time period until the vehicle propulsion system will reach the end of the external power supply track and the present temperature of the associated component or combustion engine, or simply an estimated time period until the combustion engine will be restarted. This coordinated operation of the heating system enables the component or combustion engine to exhibit it predetermined target temperature at time of reaching the end of the external power supply track. The starting time and power output of the electrical heating system is consequently calculated based on the estimated time left until the combustion engine is deemed to restart, as well as the temperature difference between present and target temperature. A stored look-up table or similar may be used for calculating the required heating time.

According to another example, the control of the electrical heating, system based on the determined vehicle relative position may enable a delay of a planned fuel-based regeneration of a exhaust particle filter PF of the exhaust aftertreatment system if an estimated time period until the vehicle propulsion system will reach the start of the external power supply track is within a predetermined time window, and subsequently performs a electricity-based regeneration if the exhaust particle filter when the electrical power collector collects electrical power from the power supply track. The electricity-based regeneration may be realised using solely the electrical heating system or in combination with conventional heating, such as increased exhaust gas temperature by supply of unburned hydrocarbons to the exhaust system. By delaying the planned fuel-based regeneration of an exhaust particle filter and subsequently using the electrical heating system for the regeneration results in improved fuel-economy and reduced costs.

The vehicle propulsion system may comprise a control unit that is arranged to control operation of the heating system based on present temperature of the associated component or combustion engine. This heating strategy is easily implemented and does not require information about time interval left until reaching the end of the power supply track, or estimated time period until restart of the combustion engine. Instead, the heating system may be controlled to constantly hold the component or combustion engine above a predetermined level, which enables an efficient exhaust aftertreatment system functionality and engine operation upon reaching the end of the power supply track. The control unit may for example determine the present temperature of the associated component or combustion engine by means of at least one temperature sensor positioned on, within and/or adjacent the associated component or combustion engine.

The heating system may be arranged to constantly operate on a predetermined power level when electrical power is supplied from the electrical power collector. This heating strategy is easily implemented and does not require information about time interval left until restart of the combustion engine, and also not about the present temperature of the associated component or combustion engine.

This disclosure also concerns a corresponding method for heating at least one component of a vehicle exhaust aftertreatment system and/or a combustion engine of a vehicle propulsion system by means of an electrical heating system.

BRIEF DESCRIPTION OF DRAWINGS

In the detailed description of the disclosure given below reference is made to the following figure, in which:

FIG. 7 shows schematically a heating strategy;

FIG. 8 shows schematically a heating strategy for achieving a target component and/or engine temperature at time of leaving the power supply track;

DETAILED DESCRIPTION

Various aspects of the disclosure will hereinafter be described in conjunction with the appended drawings to illustrate and not to limit the disclosure, wherein like designations denote like elements, and variations of the inventive aspects are not restricted to the specifically shown embodiment, but are applicable on other variations of the disclosure.

Figure 1A:
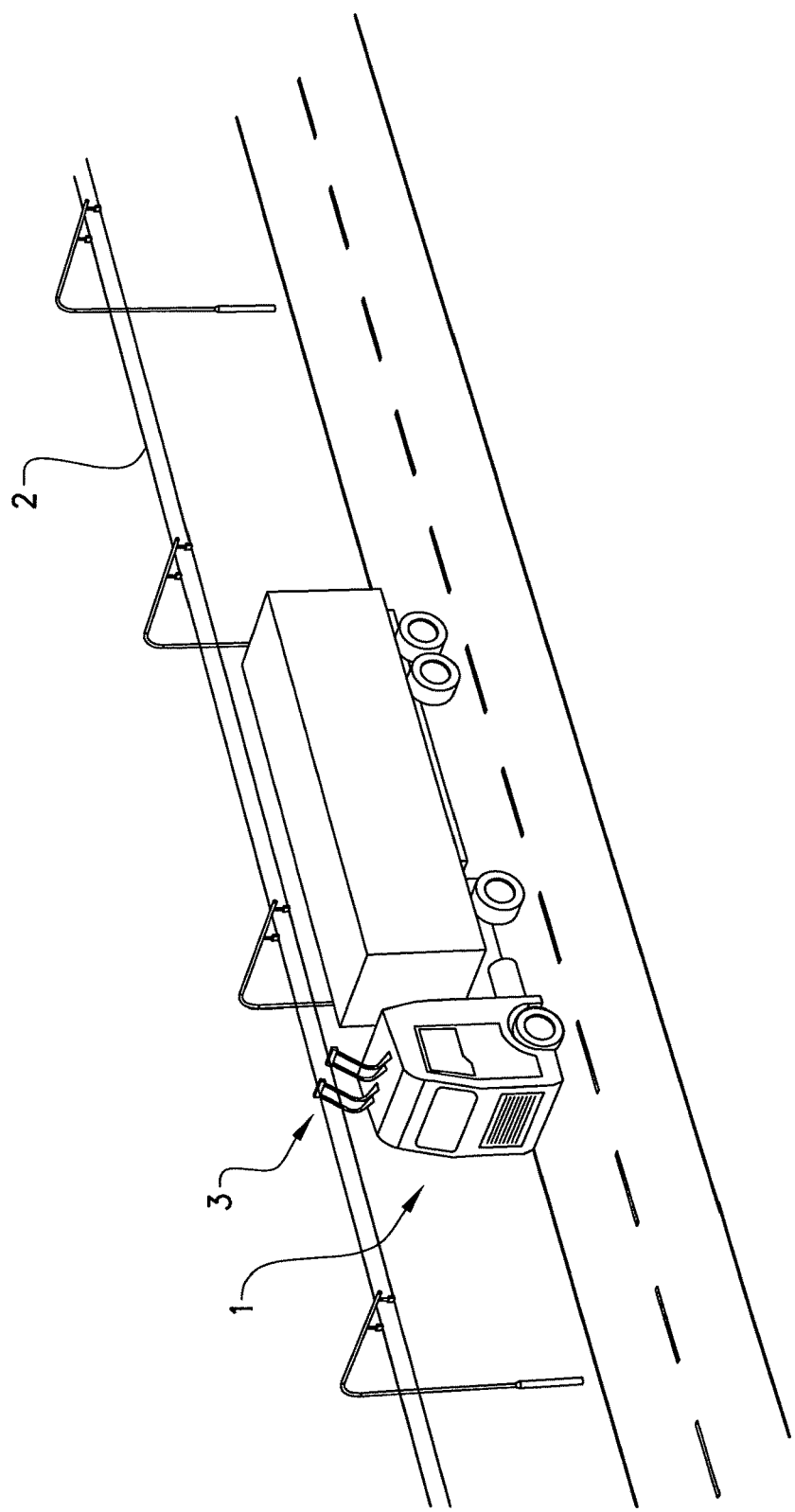
FIG. 1A shows a vehicle electrically connected to an overhead power supply track.

FIG. 1A shows a typical example where the present disclosure advantageously can be implemented. A non-railbound vehicle 1 such as a truck, having a hybrid electric propulsion system is illustrated being slidingly connected to an external power supply track 2 by means of a power collector 3 fastened to the vehicle 1. The power supply track 2 is normally not available over the entire travel path of the vehicle 1 and the power collector of the vehicle 1 must consequently be configured for intermittently collecting electrical power from the power supply track 2 at those segments of the navel path where the power supply track 2 is available. The electrical power collector 3 is configured for collecting electrical power from the external power supply track during driving and stillstand of the vehicle. The electrical power collector 3 is further preferably arranged to initiate and end collection of electrical power from the external power supply track 2 both during driving and stillstand of the vehicle. The power supply track comprises at least two separate conductors for supplying DC or AC to the vehicle. When the power supply track 2 is located above the vehicle, as in FIG. 1A, electrical power collector 3 may be designed as a pantograph. Two separate pantographs arranged side-by-side may be arranged to individually contact one of two separate conductors.

Figure 1B:
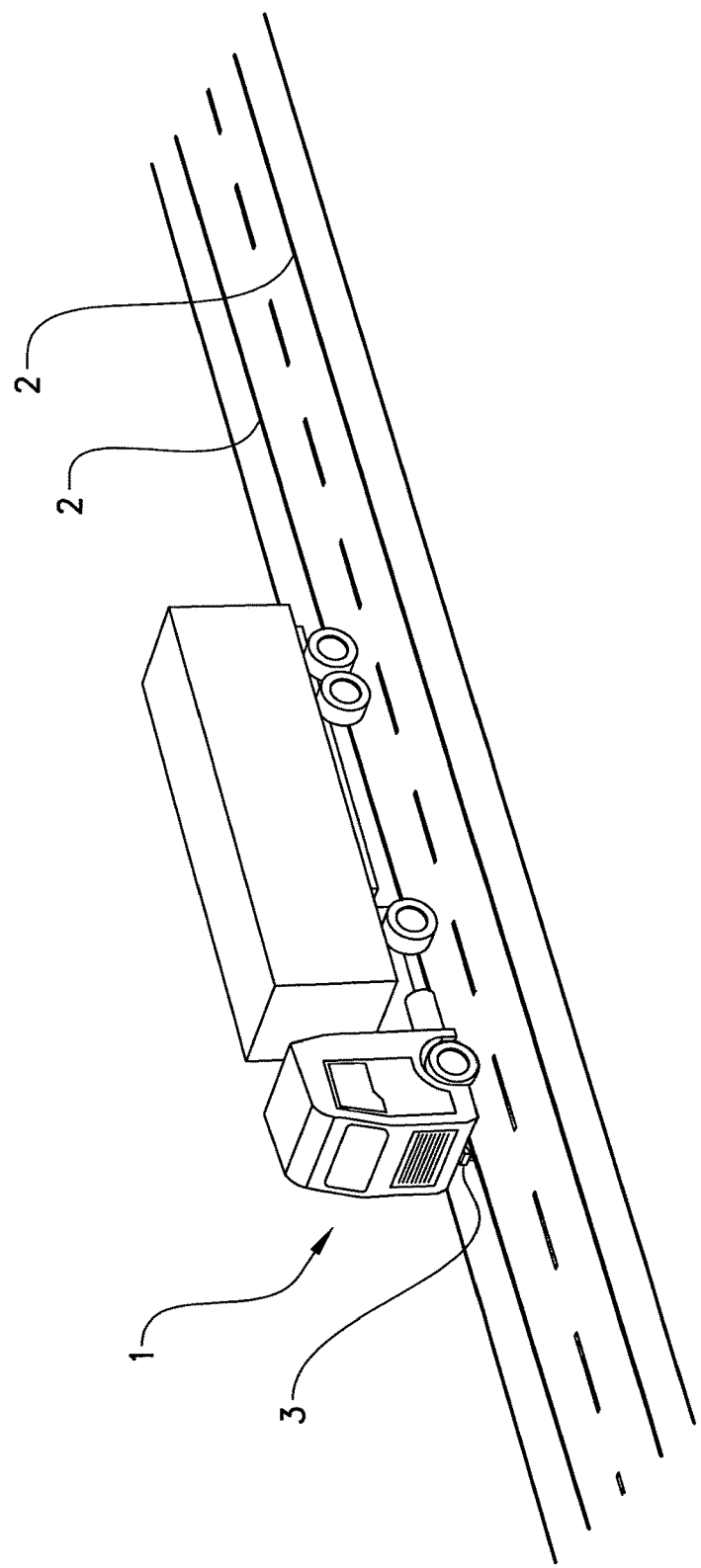
FIG. 1B shows a vehicle electrically connected to an embedded power supply track.

An alternative arrangement of the power supply track 2 is shown in FIG. 1B, where the power supply track 2 is provided embedded in the road, and where a sliding electrical contact may be established between a power collector 3 mounted under the vehicle 1 and the power supply track 2. This solution has a relatively low installation cost, is robust and enables all types of vehicles to connected to the power supply track, irrespective of the height of the vehicle. However, the disclosure encompasses also other power supply track solutions, such as a power supply track being located sideways of the vehicle 1. Similarly, the electrical power collector 3 may alternatively be arranged to collect electrical power by inductive coupling between the electrical power collector and the power supply track, located for example embedded in the ground. Inductive coupling is based on an electromagnetic field to transfer energy between two objects. Energy is sent through an inductive coupling to an electrical device, which can then use that energy to propel the vehicle propulsion system. One or more auxiliary electrical loads may additionally be powered with electrical power from the power supply track, such as one or more electrically powered compressors, air conditioning systems, battery charging, and the like.

The hybrid electric propulsion system of the vehicle 1 comprises a combustion engine having an exhaust aftertreatment system connected thereto, as well as at least one electrical traction machine. The vehicle propulsion system is configured to operate the combustion engine when the propulsion system is in a non-collecting mode, i.e. when the vehicle 1 does not collect electrical power from the power supply track 2, and to operate the at least one electrical traction machine in a collecting mode, i.e. when the power collector of the vehicle collects electrical power from the power supply track 2.

Figure 2:
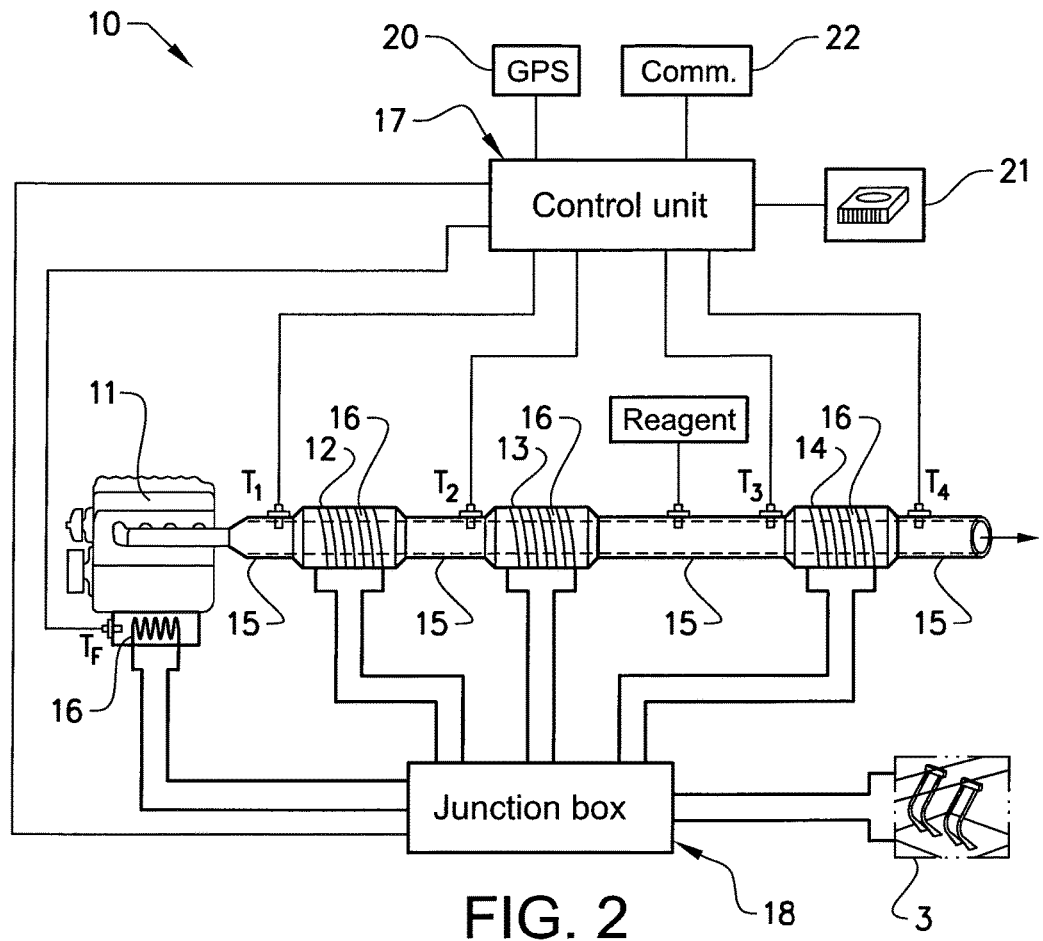
FIG. 2-5 show alternative solutions for electrical heating of the components of an exhaust aftertreatment system and engine by means of electrical power from a power supply track.

The present disclosure will be described more in detail when applied to a typical example of an exhaust aftertreatment system 10 for a diesel engine 11, as illustrated in FIG. 2. The exemplary exhaust aftertreatment system 10 comprises a diesel oxidation catalyst (DOC) 12, a diesel particulate filter (DPF) 13 and a selective catalytic reduction (SCR) catalyst 14. In combined exhaust aftertreatment systems with multiple types of catalysts, it is often beneficial to position the diesel oxidation catalyst 12 and diesel particulate filter 13 upstream the SCR catalyst 14, because the temperature of the diesel oxidation catalyst 12 needs to be above a certain threshold level, generally called the light-off temperature, to attain activation with respect to conversion of CO and HC as well as the oxidation of NO to NO2. Furthermore, the diesel particle filter 13 is often positioned upstream of the SCR catalyst 14 because using the nitrogendioxid NO2 in the exhaust gas as oxidant enables regeneration of the diesel particle filter 13 at a relatively low temperature level (e.g. 250-450° C.), compared with regeneration using oxygen as oxidant, thereby resulting in less thermal degradation of the catalytic components and a lower fuel economy penalty. In addition, the lower exhaust temperature enables a greater efficiency for the downstream reduction of NOx emissions in the SCR catalyst 14. However, the disclosure encompasses also other exhaust aftertreatment system layouts, where for example another internal order is selected, or exhaust aftertreatment systems having additional or fewer components.

The components 12, 13, 14 and engine 11 of the exhaust aftertreatment system 10 are interconnected by segments of exhaust pipe 15, but some of the components may equally be manufactured in combined unit, such as for example the diesel oxidation catalyst 12 and diesel particulate filter 13. A reagent injection system 23 for the SCR catalyst 14 is available upstream the SCR catalyst 14. Many other layouts of the exhaust aftertreatment system 10 are however included within the scope of the disclosure, such as layouts with a conventional three-way catalyst for a gasoline powered vehicles, or vehicles powered by alternative fuels, such as natural or bio gas.

The vehicle propulsion system comprises a heating system that is arranged to heat at least one component 12, 13, 14 of the exhaust aftertreatment system and/or the combustion engine 11. The disclosure comprises many alternative heating system solutions for enabling the desired heating of the components and/or the combustion engine. The heating system solution shown in FIG. 2 comprises one electrical heater 16 applied on each component 12, 13, 14 of the exhaust aftertreatment system 10, as well as on the engine 11. The electrical heater 16 is in FIG. 2 depicted as an electric resistive wire or strip that is arranged to convert electrical energy to heat. The electric resistive wire or strip may be fastened to the exterior surface the components 12, 13, 14 or engine 1, or be embedded therein. The electric resistive wire or strip of the engine may be arranged to heat the metal block forming the cylinders of the engine and/or more specifically the lubrication oil reservoir of the engine 11. According to an alternative, the electrical heater 16 may be formed by a ceramic heater. Ceramic electrical heaters may be shaped in various forms and may for example form a part of the components 12, 13, 14 of the exhaust aftertreatment system 10, such as for example an outer cover member of the components 12, 13, 14 and/or engine 11, or a member embedded therein.

Electrical power may be supplied to each electrical heater 16 from the electrical power collector 3 via a common electrical junction box 18, which may be controlled by a control unit 17. Also the electrical traction machine (non-showed) of the propulsion system may be powered via the junction box 18, which includes high power electronic components. The control unit 17 is configured to control timing and power level of each electrical heater 16. The control unit 17 may additionally receive present geographic positioning information of the vehicle from a GPS receiver 20. The control unit 17 may also have access to stored data concerning, geographical power supply track installation, such that taking into account present geographic position can calculate present vehicle position in relation to power supply track availability. The stored data may be stored in a storage device 21 on the vehicle. Alternatively, or in combination, the stored data is stored on a stationary server or the like, and made available by communication means, such as telematics. The stored data concerning location of the geographical power supply track installation may be provided from a supplier, or simply collected by a self-learning system that registers to power supply track availability during the first time of registering the power supply track. A plurality of vehicles may then also internally share the registered geographical position of the power supply track. Moreover, with knowledge about the future travel path the control unit 17 can also calculate future vehicle position in relation to power supply track availability. The system may further include a dedicated short-range communication means 22 for communicating with the power supply track installation for determining if an external power supply track 2 is available at the present vehicle position.

The control unit 17 may control operation of the electrical heating system based on the output signals of several different temperature sensors of the engine and exhaust aftertreatment system. The temperature of the gas within the exhaust pipe segment 15 located between the combustion engine 11 and the diesel oxidation catalyst 12 may be measured by a first temperature sensor T-i. The temperature of the gas within the exhaust pipe segment 15 located between the diesel oxidation catalyst 12 and the diesel particle filter 13 may be measured by a second temperature sensor T2. The temperature of the gas within the exhaust pipe segment 15 located between the diesel particle filter 13 and the SCR catalyst 14 may be measured by a third temperature sensor T3. The temperature of the gas within the exhaust pipe segment 15 located downstream the SCR catalyst 14 may be measured by a fourth temperature sensor T4 and the temperature of the engine block, engine lubrication oil with the oil reservoir or cooling may be measured by a fifth temperature sensor T5.

The temperature of a component of the exhaust aftertreatment system may for example be calculated as an average value of the measured temperature of the exhaust gas entering the component and exiting the component. Alternatively, the measured temperature of the exhaust gas entering or exiting the component may represent the temperature of a component itself. Still more alternatively, an individual temperature sensor may be located directly in contact with the exterior or interior of the component for directly measuring its temperature (non-showed). Even still more alternatively, the temperature of each component and the engine may be calculated using a mathematical model of the exhaust aftertreatment system 10, as well as measured temperature of at least one temperature sensor positioned at the engine or the exhaust aftertreatment system. The temperature output of the fifth temperature sensor T5 may represent the engine temperature.

Figure 3:
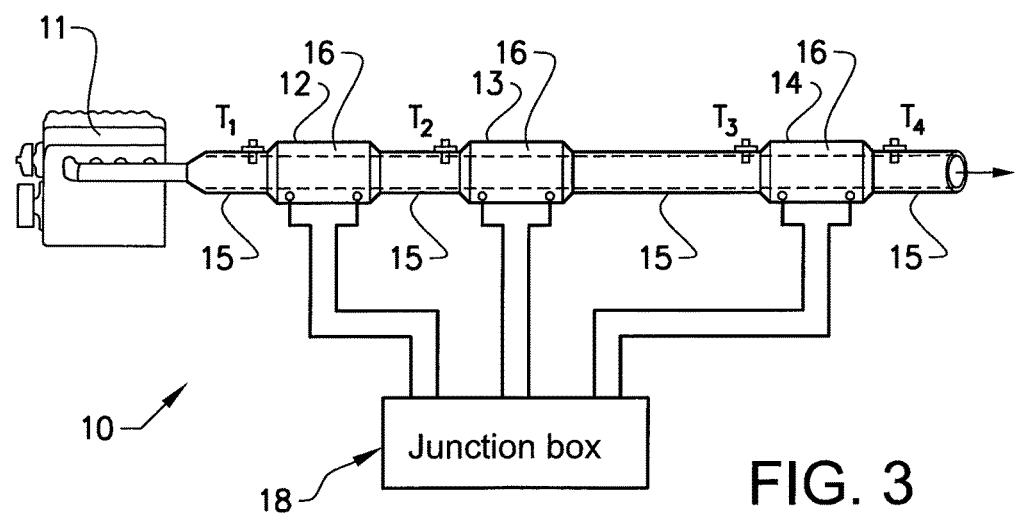

FIG. 3 corresponds to a simplified illustration of the propulsion system of FIG. 2, where details like temperature sensor signal cables, control unit 17, electrical power collector 3, reagent injection system 23, etc. are not shown. The propulsion system of FIG. 3 corresponds however to the propulsion system of FIG. 2 in all aspects except for the type of electrical heater used for the components 12, 13, 14 of the exhaust aftertreatment system 10. In FIG. 3, ceramic heaters 16 are used for heating the components 12, 13, 14. The outer cover of the components may for example be form of the ceramic heater material, or a layer of a ceramic heater is placed on the exterior or interior of the component 12, 13, 14.

The beating system of the engine and exhaust aftertreatment system shown in FIG. 2 and FIG. 3 may be varied to a large extent without departing from the disclosure. For example, each component, or at least subgroups of the components of the exhaust aftertreatment system may exhibit an individual control unit and/or an individual junction box for controlling the temperature of said component. Furthermore, not all components 12, 13, 14 of the exhaust aftertreatment system 10 or engine may be heated by the electrical heater 16. Instead only the most critical component may be heated, as for example the SCR catalyst 14 because of its strong temperature dependent NOx reduction performance. Furthermore, a combination of ceramic heated components and/or engine and electric resistive wire heated components and/or engine may be realised.

Figure 4:
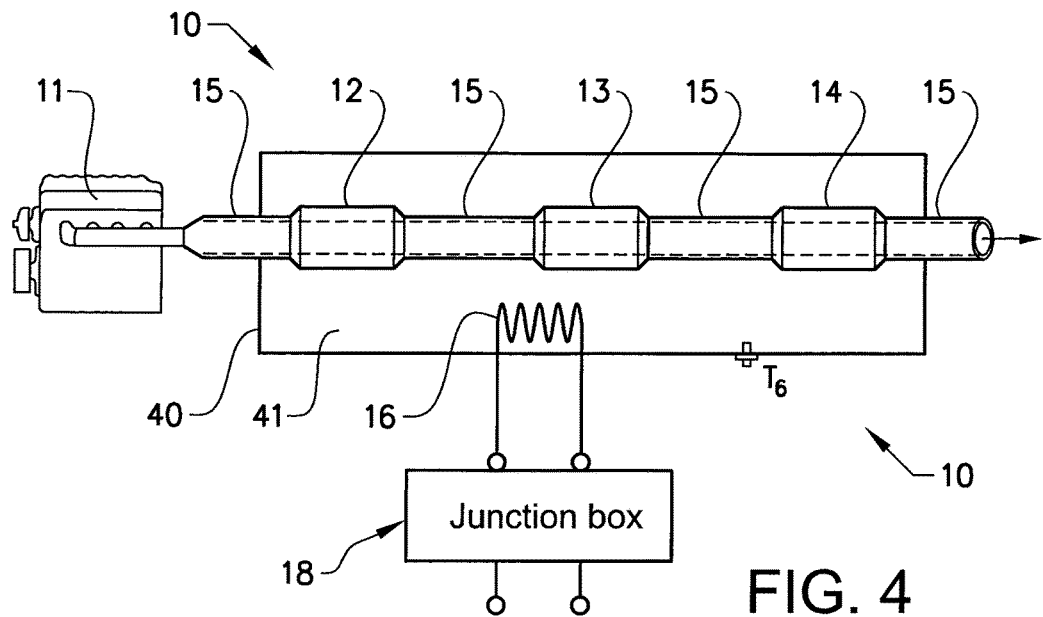

A further variation of the heating system is shown in FIG. 4, where the components 12, 13, 14 of the exhaust aftertreatment system 10 are substantially enclosed by a common housing 40 that defines a cavity 41 between the housing 40 and the exhaust aftertreatment system 10. Air within the cavity 41 may be heated by an electrical heater 16, for example an electric resistive wire, and the heated air may then supply heat to the exterior of the components 12, 13, 14 of the exhaust aftertreatment system. The temperature of the components of the exhaust aftertreatment system may be calculated based on the measured temperature provided by a temperature sensor T6 that is arranged to measure the temperature of the fluid heat transport medium within the cavity 41. A control unit 17 (non-showed) is arranged to control operation of the heater 16 in conjunction with the junction box based on the calculated temperature of the components 12, 13, 14. Also here are many alternative design solutions possible, such as enclosing only a single component, or subgroup of the components, within a housing, providing a plurality of housings, each holding different components, heating the fluid heat transport medium within the cavity or cavities, or supplying heated fluid transport medium to the cavity or cavities. Similarly, the temperature of the components of the exhaust aftertreatment system may alternatively be calculated by means of the previously described first to fifth temperature sensors T1-T5. Still more alternatively, the temperatures of the individual components of the exhaust aftertreatment system and/or the engine may be estimated using a mathematical model of the system and engine, with or without input data from temperature sensors.

Figure 5:
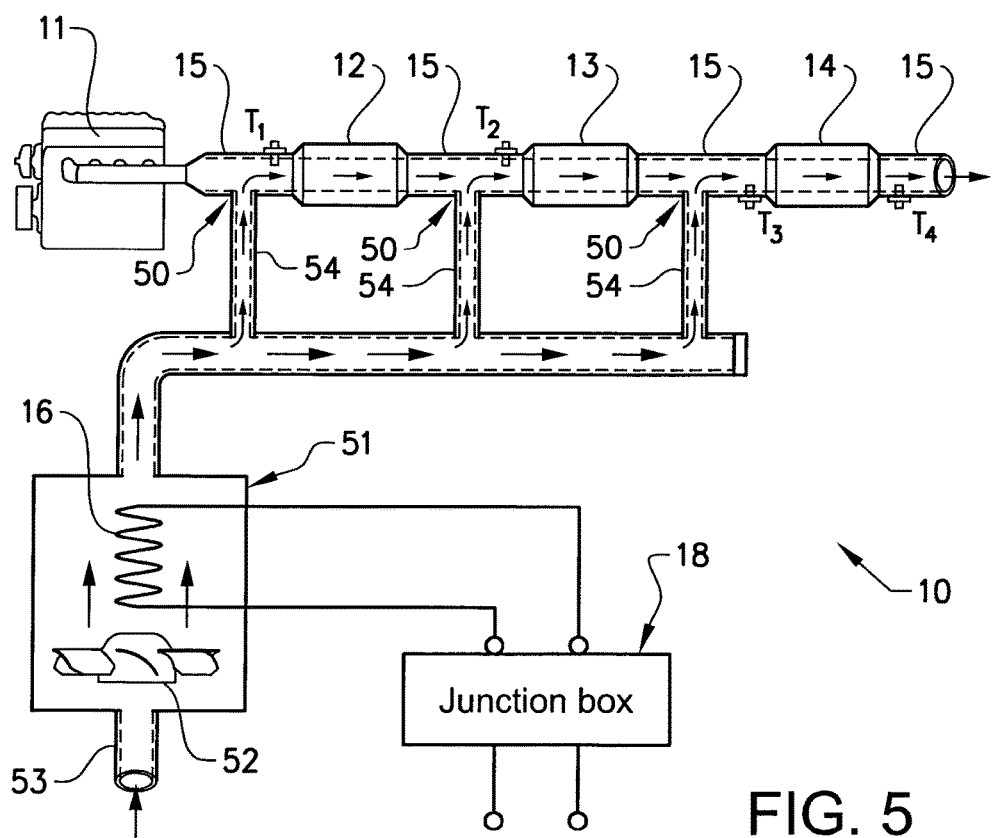

Still a further variation of the heating system is shown in FIG. 5, where the exhaust aftertreatment system comprises a flow junction 50 upstream each component of the exhaust aftertreatment system. An electrical heating device 51 comprising a fan 52 for generating a flow, and an electrical heater 16 for heating the fluid heat transport means is connected to the junction box 18. Air may consequently be sucked into an inlet 53 by the fan 52, heated by the electrical heater 16, and subsequently supplied to the exhaust pipe segments 15 upstream each component 12, 13, 14. The flow junctions 50 enable the fluid heat transport medium to enter inside the component of the exhaust aftertreatment system, thereby heating the components from the inside. Flow control means (non-showed) may be provided at each flow junction for preventing exhaust gas from entering the supply piping 54 of the fluid heat transport means. The temperature of the components 12, 13, 14 of the exhaust aftertreatment system 10 may be controlled by a control unit that controls the supply of fluid heat transport means from the electrical heating device 51, based on the measured temperature of the previously described first to fourth temperature sensors T1-T4. Also here are many alternative design solutions possible, such as heating one or more components via a single flow junction 50, calculating the temperature of the components 12, 13, 14 based on measured temperature of the fluid heat transport means in the supply piping 54, providing a plurality of electrical heating devices 51 each connected to the exhaust aftertreatment system 10 via an individual supply piping, using vehicle speed as flow generator instead of the fan 52. Still more, a closed-loop heating system may be provided where fluid heat transport means (such as air/exhaust gas mixture) exiting, one component, for example the component furthest downstream, is redirected at a first flow junction towards the electrical heating device and subsequently heated and directed to a second flow junction upstream of the first flow junction, such that essentially the same fluid heat transport means is circulated through the exhaust aftertreatment system during heating thereof and no inlet 53 is required. Note here that both FIG. 4 and FIG. 5 shows simplified exhaust aftertreatment system versions of FIG. 2. Many alternative combinations of the different heating designs of FIG. 2-5 are possible, such that for example at least one component of the exhaust aftertreatment system is heated by electrical wire or ceramic heater, and at least one component is enclosed by housing, and the like.

Figure 6:
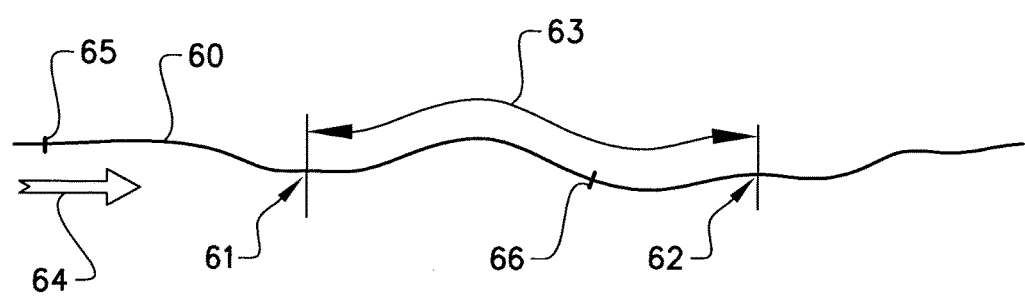
FIG. 6 show an exemplary travel path with a section having power supply track installation.

Examples of the functionality of the vehicle propulsion system and the method for heating at least one component of a vehicle exhaust aftertreatment system and/or a combustion engine of a vehicle propulsion system will hereinafter be described with reference to FIG. 6 and in combination with exemplary heating strategies. FIG. 6 illustrates a typical travel path 60 for a vehicle having a travel direction according to arrow 64. The travel path 60 comprises a first geographical point 61 denoting a start of a power supply track section 63, and a second geographical point 62 denoting an end of the power supply track section 63. The first and second geographical points 61, 62 may be defined in terms of latitude and longitude, or similar systems for determining absolute geographical position. The length of the power supply track section 63 may vary to a large extent but will likely not be shorter than about 500 meters for system to bring any substantial improved performance. Power supply track sections 63 having a length of several kilometers up to several tens of kilometers are considered appropriate.

A less complex vehicle relative position determining means may only determine power supply track availability at present vehicle position, i.e. without necessarily taking into account the present geographical position of the vehicle. This type of vehicle relative position determining means may consequently be able to detect when a power supply track is available and not available, without knowledge of future power supply track availability. The vehicle relative position determining means may for example comprise at least one sensor device that can detect the presence of the power supply track. The sensor device may for example comprise one or more cameras for visually identifying the power supply track, sensor devices sensitive w magnetic fields, radar units. The sensor device may alternatively be a dedicated short-range communication means that interact with the power supply track installation. In FIG. 6, a vehicle propulsion system having this type of vehicle relative position determining means and travelling in the direction of the arrow 64 will first upon reaching the first geographical point 61 determine availability of the power supply track. In response to this detection the vehicle propulsion system will start collecting electrical power from the power supply track using the power collector 3. Thereafter the combustion engine will be stopped and the vehicle propulsion system is propelled mainly by the electrical traction machine. Thereafter, upon passing the second geographical point 62 the vehicle relative position determining means will determine lack of power supply track, and in response thereto the combustion engine will be started and the vehicle propulsion system is propelled by the combustion engine. If the vehicle propulsion system comprises an electrical storage system the vehicle propulsion system may be propelled by the electrical traction machine also after reaching the end of the power supply track for a certain period to at least allow the combustion engine to start and be prepared to resume service as main propulsion source.

A heating strategy using the above-described vehicle relative position determining means is schematically illustrated in FIG. 7, and may involve constant operation the heating system on a predetermined power level when the electrical power collector collects electrical power from the external power supply track, which beating strategy may be referred to as warm holding. This heating strategy is not dependent on any temperature sensors or knowledge of the power supply track availability. The predetermined power level may suitably be selected to ensure that the heated components and/or engine will not fall below a temperature level that result in insufficient performance at start of the engine. In a first step 71 of the heating strategy, it is determined if electrical power is collected from the external power supply track. If yes, the warm holding function is initiated at a second step 72, which function involves electrical heating of the components 12, 13, 14 and/or engine 11. Upon determining stop of electrical power collection in a third step 73, the warm holding function is stopped in a fourth step 74.

The heating strategy may be arranged to additionally take the present temperature of the components of the exhaust aftertreatment system and/or combustion engine into account when controlling heating of the components 12, 13, 14 and/or engine 11. This heating strategy does not heat the components/engine more than necessary, thereby resulting in to more cost-effective and environment friendly heating strategy, which for example does not heat a sufficiently warm component/engine, and which consequently takes into account the climate dependent cooling rate of the components and/or engine.

In a more advance but also more efficient heating strategy, the vehicle relative position determining means is able to determine vehicle position in relation to power supply track availability for a certain future time period. For example, a dedicated short-range communication system (DSRC) of the vehicle may communicate with the power track installation for providing forecast information about the distance to the start and/or end of the power track. At least one communication point 65 along the travel path 60 ahead of the power supply track section 63 may supply information concerning length to start and/or end point 61, 62 of the power supply track. Alternatively, the vehicle relative position determining means is able to determine vehicle position in relation to power supply track availability for a complete planned travel path. This may be realised by determining the complete planned travel path of the vehicle, for example based on driver input, determining present vehicle geographical position based on a global positioning system (GPS) or similar system, and using stored data concerning geographical position of power supply track installations. With information about the vehicle position in relation to power supply track availability for a certain future time period, the control unit may be arranged to control operation of the heating system based thereon. As an alternative to GPS and DSRC, travel path recognition based on travel path characteristic may be implemented, or the use the radio-frequency identification (RFID) technology or similar transmitter/responder technology.

Such a heating strategy is schematically illustrated in FIG. 8. In a power collecting mode, the control unit may be arranged to coordinate starting, point and power level of the heating system with an estimated time period left until the vehicle propulsion system will reach the end of the external power supply track, for enabling the associated component or combustion engine to attain a predetermined target temperature at time of reaching the end of the external power supply track. The heating strategy comprises a first step 81 of estimating a time period until restart of the engine is performed, and comparing this estimated time period with a predetermined time window required to heat the components 12, 13, 14 and/or engine 11 at least to a predetermined minimum temperature level. Preferably, also the presently measured temperature of the associated component or combustion engine is taken into account during, the estimation, such that heating of a relatively warm component 12, 13, 14 and/or engine 11 is commenced relatively late. If the estimated time period is shorter than a predetermined time window, or shorter than an estimated time period necessary to heat to components 12, 13, 14 and/engine to predetermined temperature level, then the heating is commenced at a second step 82. Similar to the heating strategy of FIG. 7, in a third step 83 it is determined that electrical power is no longer collected, thereby stopping the heating function in a fourth step 84. With reference to FIG. 6, the vehicle may have past the start point 61 of the power supply track section 63 and is operating in the connected mode with the combustion engine in a stopped mode. With knowledge of the length to the endpoint 62, present vehicle speed and measured temperature data of the components 12, 13, 14 and/or the engine 11, the control system may determine to commence heating of the components and/or the engine at an intermediate geographical point 66, such that components 12, 13, 14 and/or the engine 11 will exhibit a predetermined target temperature when the vehicle reaches the endpoint 62.

Similarly, in case the electrical traction machine cannot alone provide sufficient propulsion power, for example due to insufficient maximal output power of the electrical traction machine or insufficient electrical power transfer capacity from the external power supply track to the electrical traction machine, the combustion engine may have to be restarted and temporarily operated as supplemental propulsion source, for example during certain uphill segments of the travel path. The control unit may then be arranged to coordinate starting point and power level of the heating system for enabling the components of the exhaust aftertreatment system or combustion engine to attain a predetermined target temperature at time of restarting the combustion engine. Travel path elevation data may thus be required to determine to the geographical points where restarting of the combustion engine is likely to be required. Additional data, such as present vehicle total weight, may advantageously be provided to improve calculation of starting point and power level of the heating system.

Figure 9:
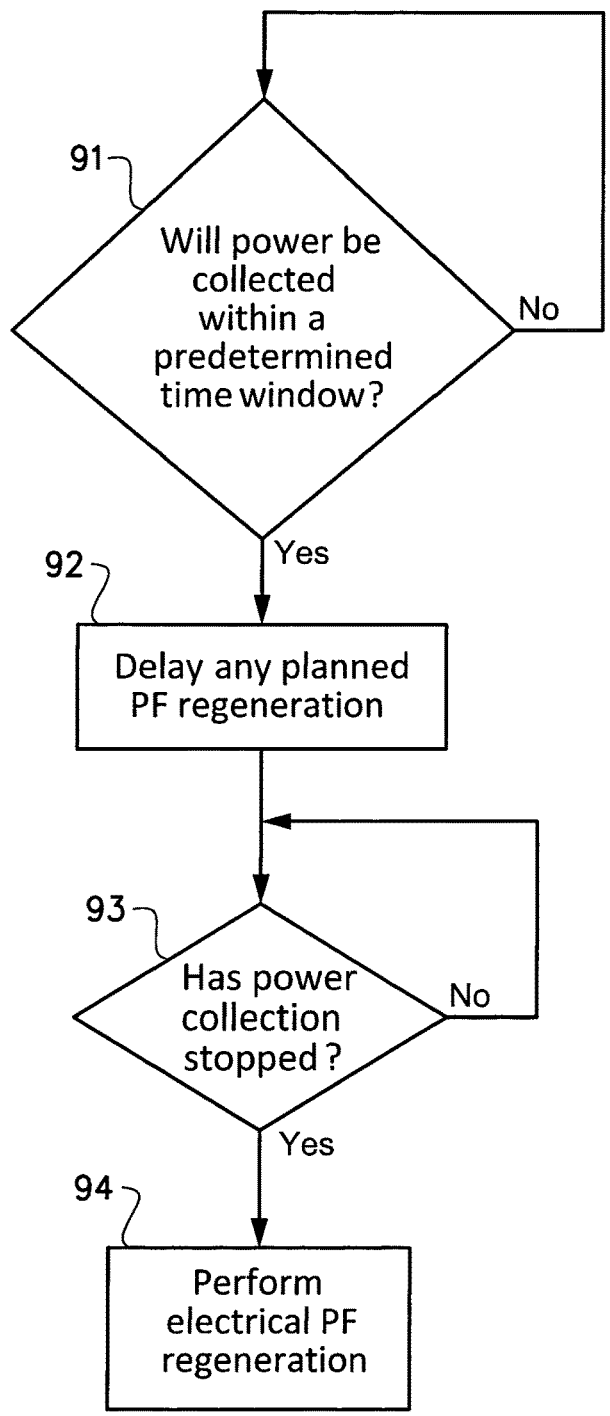
FIG. 9 shows schematically a strategy for delaying a planned particulate filter PF and performing an electricity-based particulate filter.

Electricity-based regeneration of the exhaust particle filter is also an advantageous aspect of the disclosure. A regeneration strategy is schematically illustrated in FIG. 9, in conjunction with FIG. 6. Before the vehicle reaches the start point 61 of the power supply track section 63 it is operating in the non-collecting mode and with the combustion engine in an operating state. With knowledge of the length to the start point 61 the control unit may be arranged to delay a planned fuel-based regeneration of an exhaust particle filter of the exhaust aftertreatment system. The delay may be realised by, in a first step 91 of the strategy, determining if an estimated time period until the vehicle propulsion system will reach the start of the external power supply track is within a predetermined time window. If this investigation is positive the regeneration will be delayed as a second step 92. Upon determining, in a third step 93, that electrical power from the power supply track is collected, the propulsion system will perform an electricity-based regeneration of the exhaust particle filter as a fourth step 94, thereby saving fuel.

Reference signs mentioned in the claims should not be seen as limiting the extent of the matter protected by the claims, and their sole function is to make claims easier to understand. As will be realised, the disclosure is capable of modification in various obvious respects, all without departing from the scope of the appended claims. Accordingly, the drawings and the description thereto are to be regarded as illustrative in nature, and not restrictive.

The invention claimed is:

1. A vehicle propulsion system comprising a combustion engine, an exhaust aftertreatment system connected to the combustion engine, an electrical traction machine adapted for propulsion of a hybrid electric vehicle, and an electrical power collector adapted to intermittently collect electrical power from an external power supply track during driving of the vehicle, wherein the vehicle propulsion system comprises
   a heating system that is arranged to heat at least one component of at least one of the exhaust aftertreatment system or the combustion engine,
   a vehicle relative position determining means that is arranged to determine vehicle position in relation to power supply track, and
   a control unit being arranged to control operation of the heating system based on the determined vehicle relative position,
   wherein the electrical power collector is arranged for supplying the heating system with electrical power when collecting electrical power from the external power supply track, and operation of the combustion engine is configured for being stopped during at least part of the time when collecting electrical power from the external power supply track during driving of the vehicle,
   the control unit is arranged to, upon having stopped operation of the combustion engine and while collecting electrical power from the external supply track during driving of the vehicle,
   estimate a time period until reaching the end of the power supply track, compare this estimated time period with an estimated time period necessary to heat the at least one component of the at least one of the exhaust aftertreatment system or the combustion engine to a predetermined target temperature, wherein a present temperature of the at least one component of the at least one of the exhaust aftertreatment system or the combustion engine is taken into account to estimate the time period necessary to heat the at least one component of the at least one of the exhaust aftertreatment system or the combustion engine,
   determine a starting point of a heating of the at least one component of the at least one of the exhaust aftertreatment system or the combustion engine and a power level of the heating system necessary to reach the predetermined target temperature when reaching the end of the power supply track; and
   operate the heating system so as to reach the predetermined target temperature when reaching the end of the power supply track.

2. The vehicle propulsion system according to claim 1, wherein the electrical power collector is arranged to collect electrical power while being in sliding contact with an electrical conductor of the power supply track, or by inductive coupling between the electrical power collector and the power supply track.

3. The vehicle propulsion system according to claim 1, wherein the heating system is arranged to heat the at least one component of the at least one of the exhaust aftertreatment system or the combustion engine by means of at least one electrical heater, which comprises at least one electric resistive member that is arranged to convert electrical energy to heat.

4. The vehicle propulsion system according to claim 3, wherein the at least one electric resistive member is fastened to, and arranged to conduct heat directly to the at least one component of the at least one of the exhaust aftertreatment system or the combustion engine.

5. The vehicle propulsion system according to claim 4, wherein the at least one electric resistive member comprises a metal wire or strip, or a ceramic material.

6. The vehicle propulsion system according to claim 1, wherein the heating system is arranged to heat a fluid heat transport medium and the fluid heat transport medium is arranged to heat the at least one component of the at least one of the exhaust aftertreatment system or the combustion engine.

7. The vehicle propulsion system according to claim 6, wherein the at least one component of the exhaust aftertreatment system or the combustion engine are at least partially enclosed by a common or individual housing that defines at least one cavity between the housing and the at least one component of the at least one of the exhaust aftertreatment system or the combustion engine, which at least one cavity is filled with the fluid heat transport medium.

8. The vehicle propulsion system according to claim 6, wherein the heating system is arranged to heat at least the exhaust aftertreatment system, and the exhaust aftertreatment system comprises at least one flow junction for allowing the fluid heat transport medium to enter inside the at least one component of the exhaust aftertreatment system.

9. The vehicle propulsion system according to claim 1, wherein the heating system is arranged to heat at least the exhaust aftertreatment system, and the control unit is arranged to delay a planned fuel-based regeneration of an exhaust particle filter of the exhaust aftertreatment system if an estimated time period until the vehicle propulsion system will start collecting electrical power from the external power supply track is within a predetermined time window, and subsequently perform an electricity-based regeneration of the exhaust particle filter when the electrical power collector collects electrical power from the power supply track.

10. The vehicle propulsion system according to claim 1, wherein the control unit is arranged to control operation of the heating system based on the present temperature of the component of the at least one of the exhaust aftertreatment system and the combustion engine.

11. The vehicle propulsion system according to claim 10, wherein the control unit is arranged to determine the present temperature of the at least one component of the at least one of the exhaust aftertreatment system or the combustion engine by means of at least one temperature sensor positioned on or adjacent the at least one component of the at least one of the exhaust aftertreatment system or the combustion engine.

12. A method for heating at least one component of at least one of a vehicle exhaust aftertreatment system or a combustion engine of a vehicle propulsion system by means of a heating system, wherein the vehicle propulsion system comprises an electrical power collector adapted for intermittently collecting electrical power from an external power supply track during driving of the vehicle, the method comprising the steps of
supplying the heating system with electrical power from the electrical power collector when collecting electrical power from the external power supply track during driving of the vehicle,
stopping operation of the combustion engine during at least part of the time when collecting electrical power from the external power supply track during driving of the vehicle by means of an electrical traction machine, determining the vehicle position in relation to power supply track availability, and controlling operation of the heating system based on the determined vehicle relative position so as to, while collecting electrical power from the external power supply track, and having stopped operation of the combustion engine during driving of the vehicle,
estimating a time period until reaching the end of the power supply track,
comparing the estimated time period with an estimated time period necessary to heat the at least one component of the at least one of the exhaust aftertreatment system or the combustion engine to a predetermined target temperature, wherein a present temperature of the at least one component of the at least one of the exhaust after treatment system or the combustion engine is taken into account to estimate the time period necessary to heat the at least one component of the at least one of the exhaust aftertreatment system or the combustion engine, and
determining a starting point of a heating of the at least one component of the at least one of the exhaust aftertreatment system or the combustion engine and a power level of the heating system so as to reach the predetermined target temperature when reaching the end of the power supply track; and
operating the heating system so as to reach the predetermined target temperature when reaching the end of the power supply track.

13. The method according to claim 12, comprising collecting electrical power from the external power supply track by means of an electrical power collector while being in sliding contact with an electrical conductor of the power supply track, or by inductive coupling between the electrical power collector and the power supply track.

14. The method according to claim 12, comprising heating the at least one component of the at least one of the exhaust aftertreatment system or the combustion engine by means of converting electrical energy to heat using at least one electric resistive member of an electrical heater.

15. The method according to claim 14, comprising conducting heat directly to the at least one component of the at least one of the exhaust aftertreatment system or the combustion engine by means of the at least one electric resistive member being fastened to the at least one component of the at least one of the exhaust aftertreatment system or the combustion engine.

16. The method according to claim 12, comprising heating a fluid heat transport medium, and heating the at least one component of the at least one of the exhaust aftertreatment system or the combustion engine via the fluid heat transport medium.

17. The method according to claim 16, comprising at least partially enclosing the at least one component of the at least one of the exhaust aftertreatment system or the combustion engine by at least one common or individual housing that defines a cavity between the housing and the at least one component of the at least one of the exhaust aftertreatment system or the combustion engine, which cavity is filled with the fluid heat transport medium.

18. The method according to claim 16, wherein the method includes heating at least one component of at least one of a vehicle exhaust aftertreatment system, the method comprising allowing the heated fluid heat transport medium to enter inside at least one component of the exhaust aftertreatment system by means of at least one flow junction of the exhaust aftertreatment system.

19. The method according to claim 12, wherein the method includes heating at least one component of at least one of a vehicle exhaust aftertreatment system, the method comprising delaying a planned fuel-based regeneration of a exhaust particle filter of the exhaust aftertreatment system if an estimated time period until the vehicle propulsion system will start collecting electrical power from the external power supply track is within a predetermined time window, a performing a electricity-based regeneration of the exhaust particle filter.

20. The method according to claim 12, comprising determining the present temperature of the at least one component of at least one of the exhaust aftertreatment system or the combustion engine by means of at least one temperature sensor positioned on or adjacent the at least one component of the at least one of the exhaust aftertreatment system or the combustion engine.

* * * * *